United States Patent [19]

Webb

[11] Patent Number: 5,203,544
[45] Date of Patent: Apr. 20, 1993

[54] CATTLE GUARD

[76] Inventor: A. LeVan Webb, Rte. 2, Box 1760, Lakeside, Ariz. 85929

[21] Appl. No.: 727,433

[22] Filed: Jul. 9, 1991

[51] Int. Cl.⁵ ............................................. A01K 3/00
[52] U.S. Cl. ........................................ 256/17; 256/14; 49/131; 119/155
[58] Field of Search ............... 256/17, 14, 15, 18, 256/19, 16; 99/33, 131; 119/155

[56] References Cited

U.S. PATENT DOCUMENTS

| 1,688,238 | 10/1928 | Kamas | 49/33 |
| 2,535,795 | 12/1959 | Henningsen | 256/17 |
| 2,592,225 | 4/1952 | Winkler | 256/14 |
| 3,790,135 | 2/1974 | Christianson | 256/17 |
| 4,655,435 | 4/1987 | Joseph, Jr. et al. | 256/17 |

FOREIGN PATENT DOCUMENTS

| 156385 | 5/1954 | Australia | 256/17 |
| 407642 | 9/1966 | Switzerland | 256/17 |
| 2155526 | 9/1985 | United Kingdom | 119/155 |

*Primary Examiner*—Andrew V. Kundrat
*Assistant Examiner*—Harry C. Kim
*Attorney, Agent, or Firm*—H. Jay Spiegel

[57] ABSTRACT

The disclosed cattle guard includes a base and grills which may easily be removed for cleaning without disturbing the adjacent roadway. The cattle guard includes side wings which are attached to the base to ease the removal of the grills. In a further aspect, the ends of the base include angled portions designed to facilitate funneling of water through the base while preventing ground erosion.

6 Claims, 5 Drawing Sheets

CATTLE GUARD

BACKGROUND OF THE INVENTION

Cattle guards, generally speaking, have been used for many years with cattle enclosures to allow driving of a vehicle in and out of the enclosure while preventing cattle from escaping. However, Applicant is unaware of any cattle guard which includes all of the various aspects and features of the present invention.

The following prior art is known to Applicant:

U.S. Pat. No. 1,509,739 to McLean discloses a cattle guard including a base made up of cement walls 11. The grill portion of the McLean device is bolted to the base. This is different from the teachings of the present invention wherein the base is not made of concrete and the grills may be readily removed therefrom for cleaning purposes.

U.S. Pat. No. 1,688,238 to Kamas discloses a stock barrier device which includes a plurality of supports on which parallel bars 3 rest. Kamas fails to teach a separate base and removable grills such as is disclosed herein.

U.S. Pat. No. 2,591,220 to Welter discloses a cattle guard including a base made up of a plurality of wooden timbers on which a grill structure is bolted. The side wings 36 are also bolted to the base including the timbers. This is different from the teachings of the present invention which contemplates a metallic base and grills which are readily removable therefrom.

U.S. Pat. No. 2,592,225 to Winkler discloses a portable cattle guard including a base set in concrete footings with the base and grill structure being easily removable therefrom. This is different from the teachings of the present invention which contemplates a permanent base with wings attached thereto and wherein the grills are removable for easy cleaning.

U.S. Pat. No. 2,618,469 to Mayer discloses a cattle guard having a base having a pair of end pieces and a grill which rests thereon. The present invention differs from the teachings of this patent as having different structure for the grill sub-assembly as well as different structural features for the base.

U.S. Pat. No. 3,790,135 to Christianson discloses a cattle guard having a base made up of a plurality of timbers and pipe-like sill members on which an additional layer of sill members 12 are disposed which have grill structure thereon. The present invention differs from the teachings of Christianson as disclosing a base made up of angle irons and I-beams on which a grill is removably placed.

U.S. Pat. No. 4,655,435 to Joseph, Jr. et al. discloses a cattle guard having a complicated base structure including cross pieces with cutouts therein to allow water flow therethrough. The side wings of the Joseph, Jr. et al. device are attached to the grill. The present invention differs from the teachings of this patent as attaching the side wings to the base and as including different structure in the base not requiring the cross pieces 30 which are disclosed by Joseph, Jr. et al.

Additionally, Australian patent specification 156,385 to Andrews et al. and Swiss Patent 407,642 to Blondel are known to Applicant. The Andrews et al. device has a base made up of a plurality of timbers. The present invention has a base having a different configuration. The Blondel device has a base made up of a plurality of I-beams but no side wings. As such, the present invention is believed to distinguish from these documents.

Over and above the above comments concerning the prior art known to Applicant, the present invention is patentably distinct from each of these references as including, in the base thereof, angled extensions which are provided to aid in funneling water which may flow through the base while reducing erosion of the surrounding earth.

SUMMARY OF THE INVENTION

The present invention relates to an improved cattle guard. The present invention includes the following interrelated objects, aspects and features:

(A) In a first aspect, the inventive base includes a pair of spaced runners, with each runner being made up of an elongated steel I-beam supporting a steel channel beam of C-shaped cross section. The I-beam lower crosspiece has an inwardly extending extension piece designed to provide partial support for angled braces which strengthen the base.

(B) In a further aspect, above the top crosspiece member of each I-beam, a plurality of spaced generally L-shaped supports are provided. These supports are provided to removably support the grill structure of the present invention. Additionally, a plurality of steel cross members interconnect the spaced runners. Some of the angled braces extend from the lower crosspiece of the I-beams and attach to these cross members. In this way, the weight of the grill and any vehicle or vehicles located thereon may be suitably supported. This design is made as simple as possible to make use of the inventive cattle guard economically feasible while easing the installation thereof due to the drastic weight reduction over prior art devices.

(C) Side wings are attached to the ends of the runners to interconnect the inventive cattle guard to an adjacent fence structure. The wings are attached to the base rather than to the grills to allow easy removal of the grills without disturbing the surrounding earth.

(D) At the ends of each runner, angled extensions are provided which are designed to be embedded in the earth along with the rest of the base. Angled extensions adjacent one another at adjacent respective ends of the spaced runners diverge away from one another in a direction from the main portion of the base away therefrom. This divergence creates a "funnel" which funnels any underground water which would normally flow through the base in an orderly fashion thereby preventing erosion of soil around the base.

(E) The grill is suitably made in a plurality of individual sections which, combined together, completely cover the base. Each grill is made up of a plurality of spaced supporting members which support perpendicularly directed closely spaced grill members. The spacing between the grill members is provided to prevent cattle from walking thereover. At the prescribed spacing, cattle will feel their hooves getting caught between the grill members and will be reluctant to walk over the grill.

As such, it is a first object of the present invention to provide an improved cattle guard.

It is a further object of the present invention to provide such a device including a base which is permanently mounted within the ground and a grill which is removable therefrom.

It is a yet further object of the present invention to provide such a device including side wings attached to the base to allow easy removal of the grills.

It is a still further object of the present invention to provide such a device having angled extensions on the base designed to funnel water through the base to prevent soil erosion.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
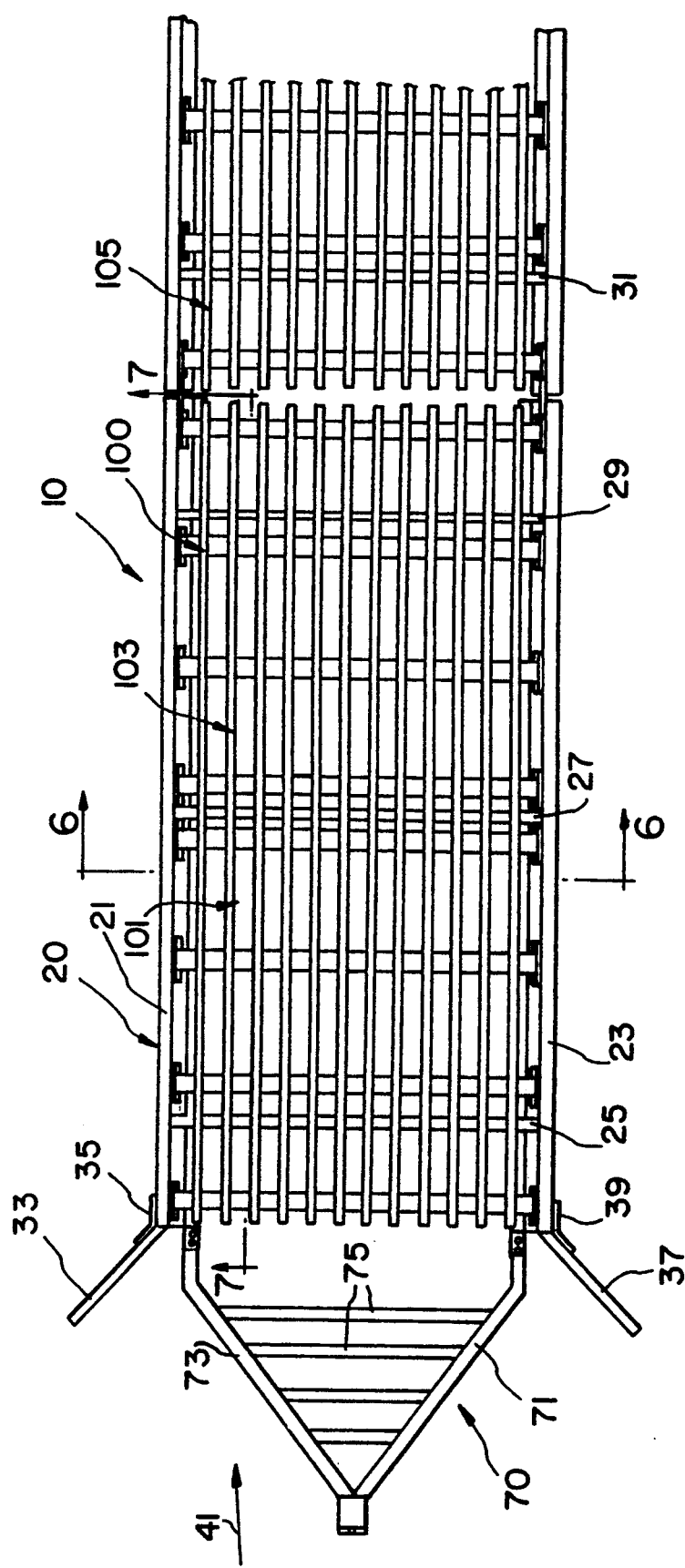
FIG. 1 shows a top view of a portion of the present invention.

With reference, first, to FIG. 1, the present invention is generally designated by the reference numeral 10 and includes a base generally designated by the reference numeral 20 and a grill generally designated by the reference numeral 100.

As seen in FIG. 1, the base includes spaced runners 21, 23 which are connected together by cross members 25, 27, 29 and 31.

The runner 21 has an angled extension 33 which is attached to the runner 21 by a suitable angled fastener 35. Similarly, the runner 23 has an angled extension 37 suitably attached to the runner 23 by an angled fastener 39. As seen in FIG. 1, the extensions 33, 37 diverge from one another in a direction away from the rest of the base 20. Thus, water flowing toward the base 20 in the direction of the arrow 41 will be funneled between the runners 21, 23 by the extensions 33, 37. This funneling action reduces erosion which would take place, especially at the ends of the runners 21, 23 which would occur without inclusion of the extensions 33, 37. These extensions also provide additional lateral support for the base 20. Similar extensions (not shown) are located at the other ends of the runners 21, 23.

Figure 2:
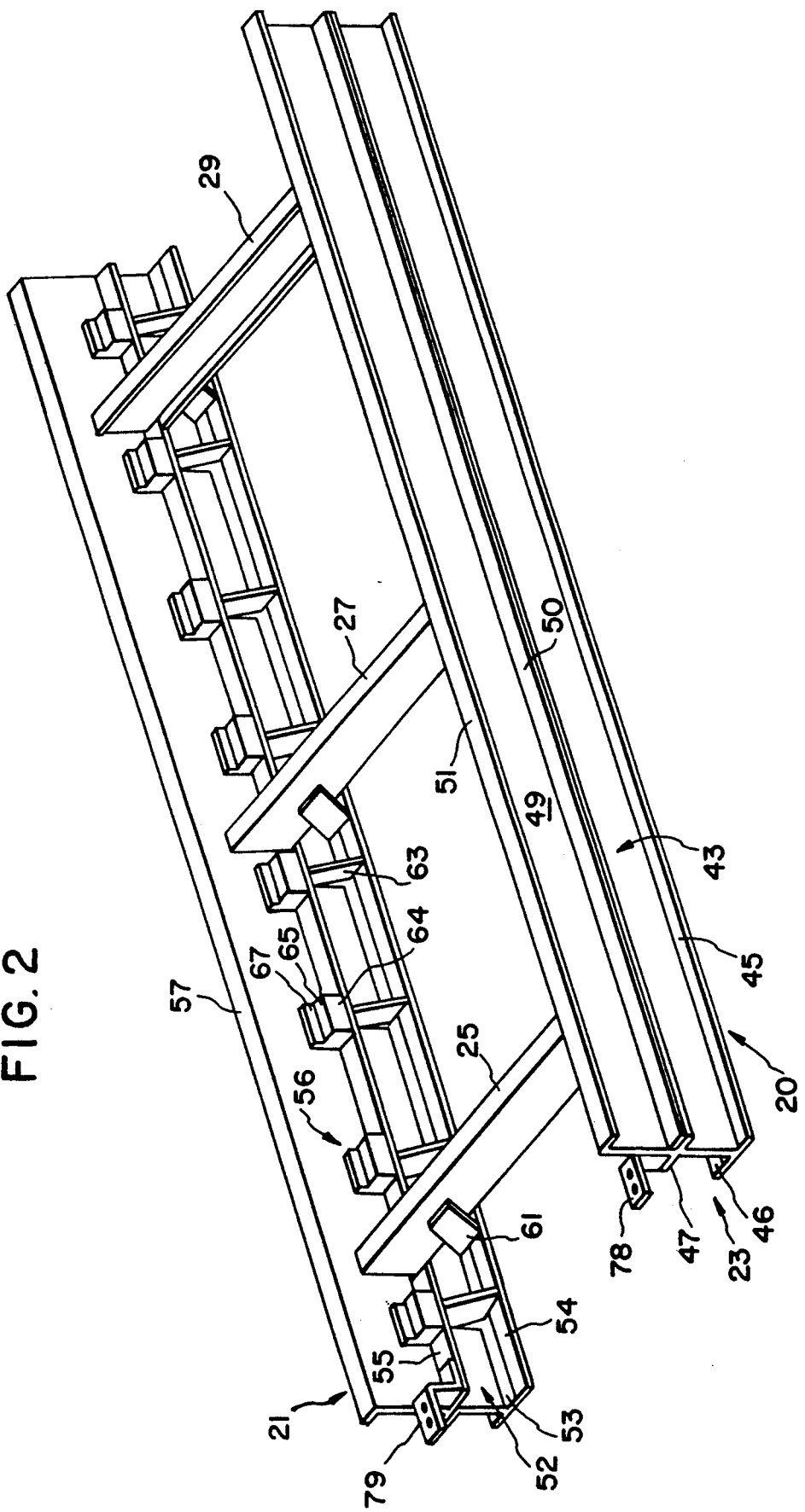
FIG. 2 shows a perspective view of a portion of the inventive base.
Figure 6:
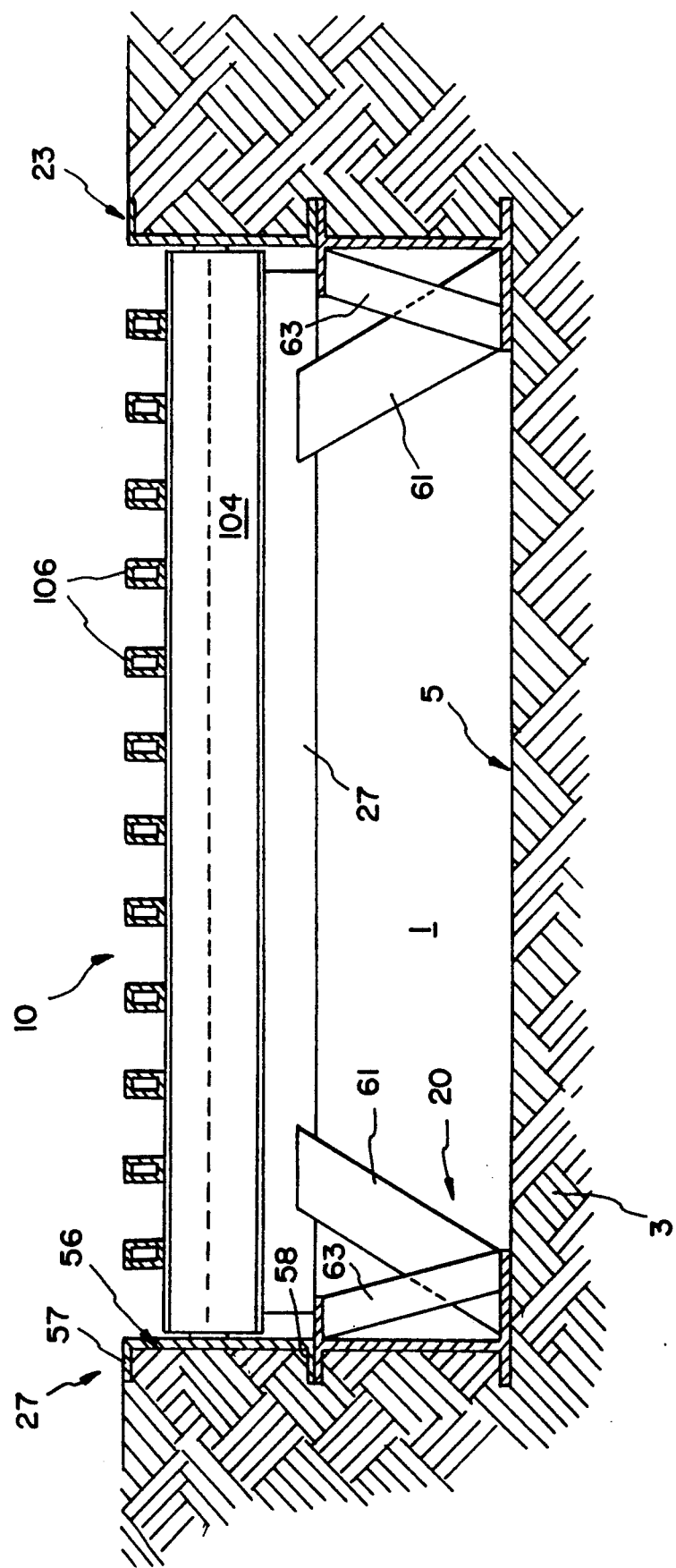
FIG. 6 shows a cross-sectional view along the line 6—6 of FIG. 1.

With particular reference to FIGS. 2 and 6, additional details of the base 20 will be described in greater detail. Thus, the runner 23 is seen to include an I-beam 43 having a lower crosspiece 45 and an upper crosspiece 47. The lower crosspiece 45 has an inner extension 46 for a purpose to be described in greater detail hereinafter. The upper crosspiece 47 suitably supports a steel channel beam 49 having a C-shaped cross-section, with the lower crosspiece 50 thereof being supported on the upper crosspiece 47 of the I-beam 43, and with the upper crosspiece 51 extending parallel to the lower crosspiece 50.

In a similar way, the runner 21 includes an I-beam 52 having a lower crosspiece 53 and an inner extension 54. The upper crosspiece 55 of the I-beam 52 supports a C-shaped channel beam 56 which has an upper crosspiece 57 and a lower crosspiece 58 (FIG. 6).

FIG. 2 shows the cross members 25, 27 and 29 with the cross member 27 being shown in FIG. 6. With further reference to FIGS. 2 and 6, it is seen that angled braces 61, 63 are provided to provide additional support for the inventive device 10. A multiplicity of angled braces 61 and angled braces 63 are employed on each side of the base 20. As best seen in FIGS. 2 and 6, the angled braces 61 extend from the lower crosspieces and inner extensions of the I-beams up to respective side walls of the cross members. These angled braces are suitably welded at each end thereof with the inner extensions 46, 54 on the lower crosspieces of the I-beams providing part of the support for the lower portions thereof. Of course, the various components of the intervening base 20 may be assembled together using bolts and nuts or any other suitable fastening means.

The angled members 63 extend from the inner extensions of the lower crosspieces of the I-beams upwardly to the upper crosspieces thereof. The inner extensions 46, 54 of the lower crosspieces of the I-beams allow the angled members to be angled as shown to provide support both vertically and laterally.

With reference to FIG. 2, it is seen that the upper crosspieces of the I-beams support a multiplicity of L-shaped supports 64. Each of these supports 64 includes a support surface 65 as well as a side wall surface 67. As will be described in greater detail hereinafter, the support surfaces 65 are designed to support the grill structure 100 while the side walls 67 limit lateral movement of the grill structure 100.

Figure 4:
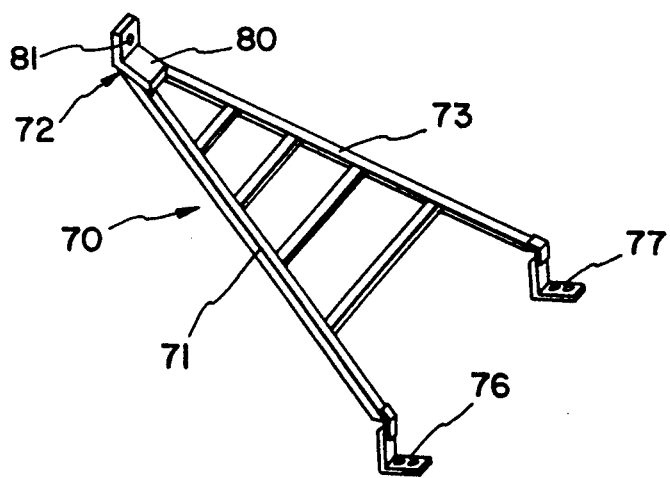
FIG. 4 shows a perspective view of a side wing of the present invention.

With reference to FIGS. 1, 2 and 4, the present invention includes a pair of side wings which interconnect the base 20 to adjacent fence structure (not shown). Each side wing 70 includes two angled members 71, 73 having connected therebetween a plurality of connecting pieces 75 to form a generally triangular structure.

With particular reference to FIGS. 2 and 4, it is seen that the angled members 71, 73 have respective L-shaped brackets 76, 77 which allow attachment to the base 20. For this purpose, the base 20 has corresponding brackets 78, 79 having suitable holes which may be aligned with corresponding holes in the brackets 76, 77 so that bolts (not shown) may be used to suitably bolt the side wings 70 to the base 20. In a further aspect, with particular reference to FIG. 4, the angled members 71, 73 meet at an apex 72 where a further L-shaped bracket 80 is provided which has a single hole 81 therethrough designed to allow receipt of a bolt (not shown) which may be used to suitably bolt the wing 70 to adjacent fence structure (not shown).

Figure 3:
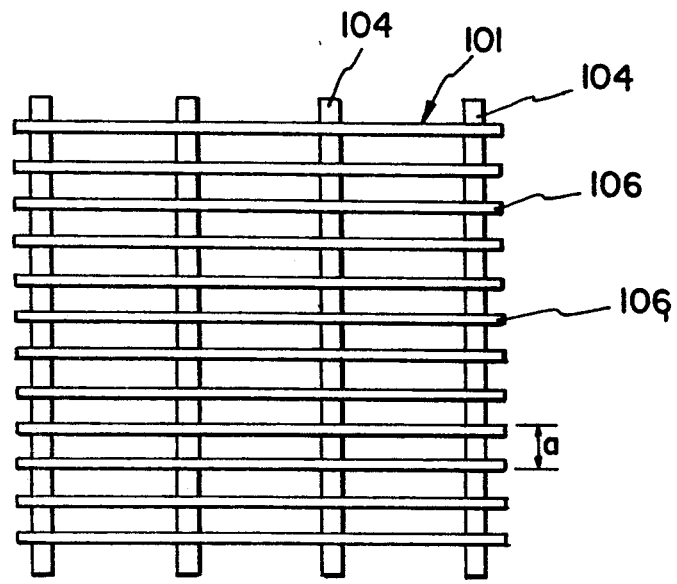
FIG. 3 shows a top view of one grill sub-assembly.
Figure 7:
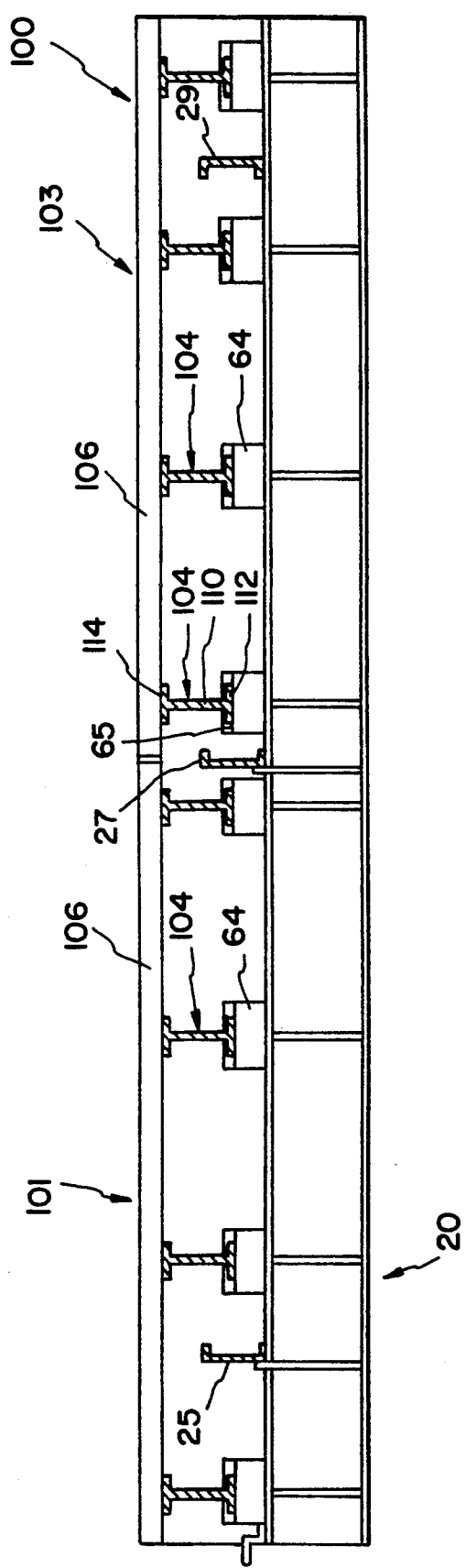
FIG. 7 shows a cross-sectional view along the line 7—7 of FIG. 1.

With particular reference, now, to FIGS. 3, 6 and 7, the inventive grill 100 is seen to be made up of a plurality of grill sections of which the grill sections 101, 103 and 105 are shown in FIG. 1. FIG. 3 shows the grill section 101 which includes parallel support members 104 and perpendicular crosspieces 106 which are spaced from one another a distance a specifically designed to deter cattle from walking thereon. This spacing a is sufficient to cause the hooves of cattle to enter between adjacent crosspieces to frighten cattle into thinking that they will be caught in the grill 100. In this way, cattle are precluded from escaping from an enclosure including the inventive cattle guard 10.

As best seen in FIG. 7, the support members 104 comprise I-beams having a vertical portion 110, a lower crosspiece 112 and an upper crosspiece 114. As seen in FIG. 7, the lower crosspiece 112 sits on the support surface 65 of one of the L-shaped supports 63. The upper crosspiece 114 supports the cross members 106. The supports 104 are of a length which corresponds to the spacing between the side walls 67 of opposed supports 64 to limit lateral movement of the grills 101, 103, 105.

Figure 5:
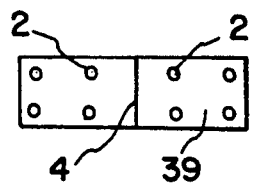
FIG. 5 shows a top view of a fastening plate which may be used in the present invention.

In a further aspect, with reference to FIG. 5, a side view of the angled fastener 39 which is designed to interconnect the angled extension 37 to the runner 23 is shown. This device includes a plurality of holes 2 designed to receive bolts which may also extend through holes (not shown) in the angled extension and runner to allow bolting of these components together. The angled fastener 39 is bent at the reference numeral 4. Two angled fasteners such as that which is illustrated in FIG. 5 are used to attach each angle extension to its respective runner.

As best seen with reference to FIG. 6, in order to install the inventive device 10, a pit 1 is dug in such a way that the crosspieces of the I-beams as well as of the C-shaped channel beams are laterally embedded within the earth 3 but with the pit 1 providing a substantially open channel 5 allowing free flow of water therethrough. In other words, with reference to FIGS. 2 and 6, the cross members 25, 27 and 29 are suspended above the bottom of the pit 1 a sufficient distance to preclude their presence effecting free water flow through the base 20. This structure in conjunction with the angled extensions 33, 37 at each end of the runners 21, 23 allows the funneling and free flow of water through the base 20 to prevent flow of water through the base 20 from causing soil erosion. In this way, once the device 10 has been installed as shown in FIG. 6, little subsequent maintenance of the site is required and the grills 101, 103, 105 may easily be removed for cleaning without the necessity of removing the side wings 70 as well. Making the grill 100 out of a plurality of subcomponents allows these subcomponents to be easily removed using equipment normally in the possession of a rancher such as, for example, a back hoe or tractor. The grills 101, 103, 105 are made in standard easily manufactured dimensions.

As such, an invention has been disclosed in terms of a preferred embodiment thereof which fulfills each and every one of the objects of the invention as set forth hereinabove and provides a new and useful cattle guard of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved cattle guard comprising:
   a) a base buried underground in a pit having a floor and including:
      i) a pair of elongated spaced runners supported on said floor;
      ii) a plurality of cross members, each of said cross members being interconnected between said runners and being suspended above said floor to allow free flow of fluid through said base;
      iii) each of said runners having an angled extension attached at each end thereof with adjacent angled extensions of said spaced runners diverging from one another in a direction away from said runners to provide a funnel-like shape to funnel fluid between said runners; and
   b) a grill structure removably placed on said base.

2. The invention of claim 1, wherein each of said runners comprises an elongated I-beam supporting an elongated channel beam of C-shaped cross-section.

3. The invention of claim 2, wherein said I-beam has a lower crosspiece supporting angled braces extending to respective ones of said cross members.

4. The invention of claim 2, wherein L-shaped supports are mounted on each I-beam and support said grill structure.

5. The invention of claim 1, wherein said base includes a side wing connected to said base at each end thereof for connecting said cattle guard to adjacent fence structure.

6. The invention of claim 1, wherein said grill structure comprises a plurality of grills, each of said grills including a plurality of spaced supporting members and a plurality of grill members perpendicular to said supporting members.

* * * * *